(No Model.)

C. M. MOORE.
METHOD OF MAKING WHEEL RIMS.

No. 549,246. Patented Nov. 5, 1895.

Witnesses.
John F. Nelson.
Francis E. Stanwood

Inventor.
Chester M. Moore.
By H. E. Louge Atty.

UNITED STATES PATENT OFFICE.

CHESTER M. MOORE, OF MALDEN, MASSACHUSETTS.

METHOD OF MAKING WHEEL-RIMS.

SPECIFICATION forming part of Letters Patent No. 549,246, dated November 5, 1895.

Application filed October 18, 1894. Serial No. 526,257. (No model.)

*To all whom it may concern:*

Be it known that I, CHESTER M. MOORE, a citizen of the United States, residing at Malden, in the county of Middlesex and State of Massachusetts, have invented certain new and useful Improvements in Methods of Making Wheel-Rims; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to wheel-rims; and it consists in an improved method for manufacturing the same, particularly such as are designed for use in bicycle-wheels, as likewise in a novel article of manufacture created by said method.

One of the ulterior objects in the manufacture of a rim for a bicycle-wheel is to have lightness. Combined with this feature there must be strength and a certain amount of resiliency. Hitherto the rims of bicycles have been constructed of metal, or steel, aluminium, or other suitable metals, while in some instances the rim has been made up of a series of thin layers or laminæ of wood or other tough material.

The purpose of my invention is to produce a rim which is to consist of a seamless or integral ring composed of some finely-comminuted fibrous material or materials in different proportions and so united or matted together as to form a homogeneous sheet or mass. Further, said mass is to be applied when in a plastic or moist unshrunk condition upon a mold or former by means of which in the process of drying or curing the requisite shape in cross-section is to be imparted to the blank or unformed rim.

The various steps and the subsequent treatment which the blank successively undergoes in order to produce a perfect and complete rim under my method will be hereinafter fully described.

Figure 1:
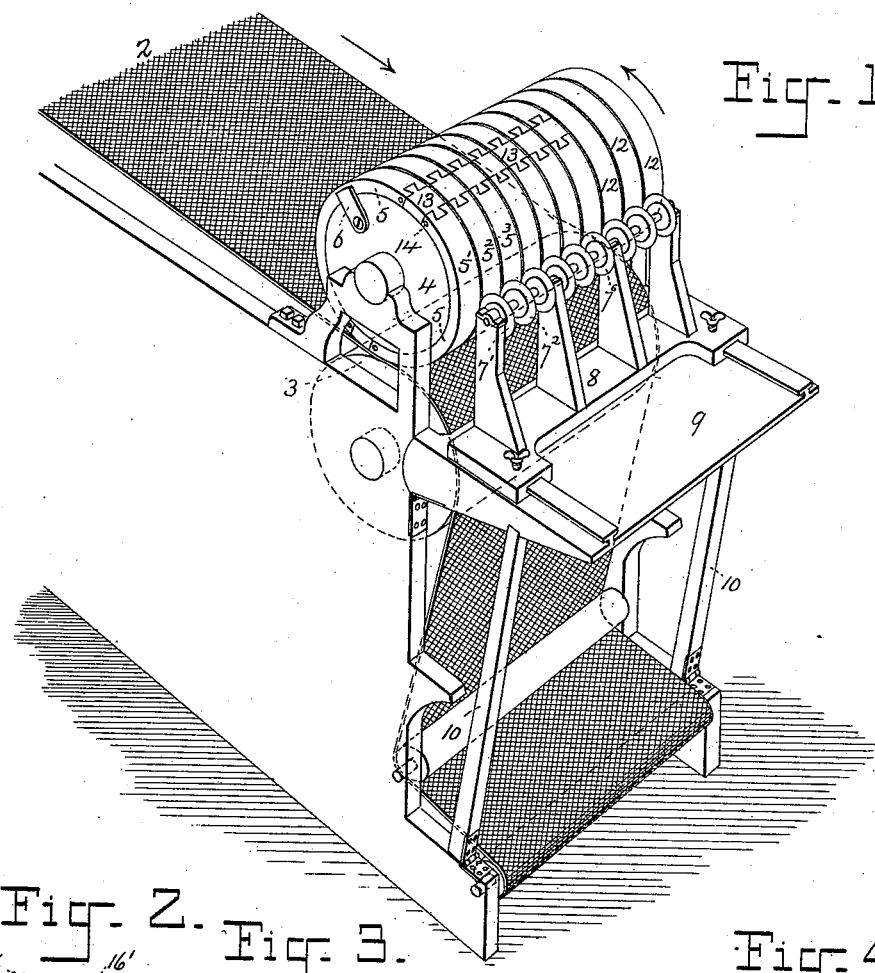
Figure 2:
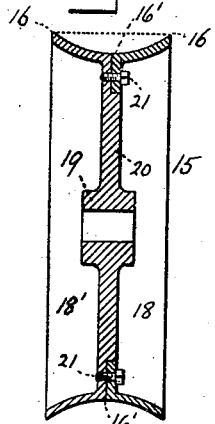
Figure 3:
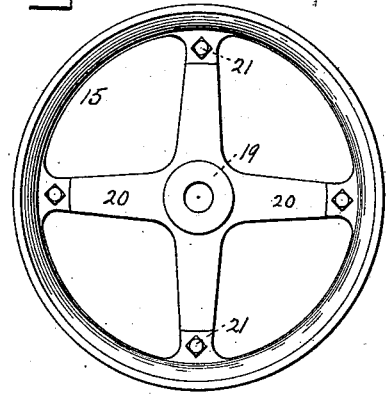
Figure 4:
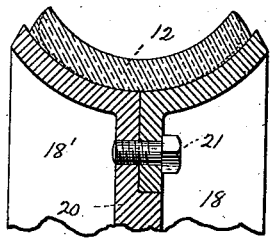

The drawings herewith presented represent, in Figure 1, a perspective view of one form of apparatus by means of which my method is carried out and the rim thereunder is produced. Fig. 2 is a diametrical section of a separable mold by which requisite shape in cross-section is imparted to the rim-blanks. Fig. 3 is a side elevation of the same. Fig. 4 is a cross-section in part of a mold enlarged, showing the position of the rim after shrinkage has taken place.

In the production of wheel-rims, particularly such as are designed for bicycles, experiments under my method have demonstrated that given a certain quantity of wet pulp or comminuted fiber—such as is used in the manufacture of paper, leather-board, and the like analogous articles—provided said material, in the form of a blank and before shrinkage has occurred or while it is in a plastic condition, is placed upon a suitable mold, and then allowed to shrink and be properly cured, a rim will be produced not only of any desired shape in cross-section, but it will combine great strength and toughness with the proper amount of resiliency.

To produce a rim under the conditions hereinabove premised embodies the spirit of my invention, and I shall now proceed to describe the several steps which are necessary in the carrying out of my process.

My first proceeding is to procure a quantity of stock or pulp composed of such material or admixture of material as will impart the requisite degree of strength to the finished product, preferably rope fiber. This material is to be properly treated in a beating-engine until it is reduced to a finely-comminuted mass, which is to be sized while in the beater and then delivered upon an endless apron or felt 2. This latter is to travel continuously and is arranged to pass between two rolls 3 4, by means of which said pulp is transferred or picked up and formed about the upper roll 4. In this manner a quantity of the pulp is matted in a homogeneous endless mass about the periphery of the upper roll. Rotation of the rolls is continued until the requisite thickness of material is obtained.

Inasmuch as the rims are to be produced in quantity, and in order to form a number of the blanks for the rims simultaneously, I proceed as follows: In lieu of forming the material in a single sheet of a width equal to the length of the roll and then subdividing it I have provided said upper roll with a series of annular rings 5' 5² 5³, which are grouped together and held upon the body portion of the roll by one or more fastening devices 6. In connection with said rings a group of revoluble disks 7' 7² 7³, adjusted opposite the joint or division-line between any two of the rings, are mounted upon a movable carriage 8. Preferably this carriage or stand is attached to a swinging shelf 9, temporarily upheld by posts 10 in such manner that the carriage and disks may be easily displaced to allow the roll to be taken out of its bearings. Thus it will be understood that during the formation of the material about the upper roll the disks are operating to remove pulp at certain designated points upon the periphery of the roll, each disk describing a transverse path by means of which the material or pulp accumulating upon said roll is divided into as many annular blanks 12 as there are rings grouped upon the roll. When the desired thickness is attained, the machine is stopped. The roll 4 is now removed and the rings having the blanks are slipped off, while empty ones are substituted. In this way a series of blanks are created, which are plain annular pieces, each designed to form a rim. After being removed from the rings they are then to be placed upon a mold. To enable the blanks to be easily removed from the rings without disturbing or breaking them, since the material composing them is now in a moist plastic condition, said rings are made in two pieces 5 5, jointed by interlocking keys 13, held in place by screws or other means 14.

After removal from the rings the blanks are laid upon some smooth flat surface and the molds or formers 15 are applied upon their inner circumference, it being understood that the blanks in diameter are the same or slightly larger than the diameter of the edges 16 of the molds. These latter, as will be seen, are made separable and split longitudinally in lieu of being formed of sections radially divided. This form of construction is necessary in order to enable the blanks to be removed after they have been cured and properly shrunk. The molds in their entirety are inserted within the blanks, as shown in Fig. 2, where the dotted line indicates the position of the inside face of the blank. Since the central circumference 16' of the mold is somewhat less than that of the two edges 16, it is evident that an excess of material occurs in the median line of the blank. Hence when shrinkage takes place the thickness of the blank is not reduced so much, and consequently greater thickness occurs at this point, where it is desired. Conversely the edges of the blank having an equal amount of material with the center are stretched or drawn out and made somewhat thinner for the reason that the same quantity of material as is contained in the central portion must encircle the edges 16 of the mold, which exceed in length by considerable the length of the central circumference 16'.

Reference to Figs. 2 and 3 shows that the mold proper 15 is composed of two halves 18 18', the latter including a central hub 19, with a series of radial arms 20, to which the opposite corresponding half 18 is bolted at 21. Moreover, the face of this mold is such that a curved surface is formed in order to produce a rim of which the inner periphery is convex and the outer concave, thus creating the general shape and cross-section found in rims designed for the wheels of bicycles. When the two halves are bolted together, a firm unyielding mold is produced.

After the blanks are applied to the molds the latter are to be maintained in a horizontal position and stacked up, thin flat boards being interposed between each mold. In this way a horizontal continuous support is afforded the blank and prevents any distortion when first applied about the mold. Furthermore, the hubs of the latter are transversely bored in order that they may be mounted upon an arbor and the blank trued up before removal from the mold. After the blanks are placed about the molds and to compel the particles composing said blanks to assume the exact shape of the mold the latter may be subjected to artificial heat if rapidity in the process is desired; or cool dry air may be passed over them when the process is conducted more slowly. When the blanks have been thoroughly dried and cured and the shrinkage has taken place, a fine tough homogeneous rim is produced without seam or joint of any kind and conforming exactly in dimensions and shape to that of an ordinary rim for a bicycle-wheel. After, or preferably before, removal of the bolts 21, whereby the two halves are separated, the rim is in readiness for final touches by a cutting or trimming tool at points where it may be needed. Subsequently as a last step it is treated with some waterproof finish and is in readiness for the spokes. In Fig. 4 the dotted lines represent the rim after it has been shaped up.

For economy in manufacture I propose to adopt the following plan, which consists, in lieu of collecting the pulp and forming it in annular shape about the sectional rings, and then transferring said blanks to the molds for subsequent treatment, in providing the molds of any desired cross-section and adapting them for mounting upon the roll 4. In this way the manufacture is expedited. In the formation of the blanks by the accumulation of pulp fiber about the mold itself it is to be understood that the same divisional arrangement of the mold occurs in order to provide for the removal from about the molds of said rim when properly shrunk.

What I claim is—

1. The process for producing wheel rims, comprising the following steps: in accumulating comminuted fibrous material to produce a homogeneous tubular mass; in subdividing the same into a number of annular cylindrical blanks; and finally causing the blank to shrink to assume a predetermined curvilinear shape in cross-section, as herein explained.

2. The method of manufacturing wheel rims curved in cross-section, consisting in collecting a homogeneous mass of fibrous pulp in annular form and curved in cross-section; in molding said mass to assume a fixed shape by changes in the position of the particles due to the shrinkage; and lastly in water-proofing and finishing the rim so produced, as herein stated and described.

3. The method of manufacturing wheel rims, consisting in collecting a homogeneous mass of fibrous pulp in annular form as blanks; in subjecting said mass while in a plastic condition to a drying process; in molding said blank to assume the fixed shape of a finished wheel rim and produced by changes in the position of the particles due to shrinkage; and finally in water-proofing the rim so produced, as herein stated and described.

In testimony whereof I affix my signature in presence of two witnesses.

CHESTER M. MOORE.

Witnesses:
H. E. LODGE,
ALFRED M. MOORE.